(12) United States Patent
Chaudhari et al.

(10) Patent No.: US 6,577,365 B1
(45) Date of Patent: Jun. 10, 2003

(54) METHOD AND APPARATUS TO FORM LIQUID CRYSTAL ALIGNMENT LAYER

(75) Inventors: Praveen A. Chaudhari, Briarcliff Manor, NY (US); Eileen Ann Galligan, Fishkill, NY (US); James Patrick Doyle, Bronx, NY (US); James Andrew Lacey, Mahopac, NY (US); Shui-Chih Alan Lien, Briarcliff Manor, NY (US); Hiro Nakano, Shiga (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/548,991

(22) Filed: Apr. 14, 2000

(51) Int. Cl.$^7$ .............................................. G02F 1/1337
(52) U.S. Cl. ...................... 349/124; 349/125
(58) Field of Search ................. 349/124, 125; 204/157.15; 156/655

(56) References Cited

U.S. PATENT DOCUMENTS

| 5,030,322 A | * | 7/1991 | Shimada et al. ............. 156/655 |
| 5,770,826 A | | 6/1998 | Chaudhari et al. ...... 204/157.15 |

\* cited by examiner

*Primary Examiner*—William L. Sikes
*Assistant Examiner*—Thoi V Duong
(74) *Attorney, Agent, or Firm*—Ohlandt, Greeley, Ruggiero & Perle, L.L.P.; Marian Underweiser

(57) ABSTRACT

Disclosed is a method for forming an alignment layer for use in a liquid crystal display cell. The present invention includes a method of determining ion beam source operation parameters to provide a twist angle that is less than a predetermined maximum twist angle. The present invention also discloses a method for forming an improved liquid crystal display cell and an improved liquid crystal display.

9 Claims, 6 Drawing Sheets

METHOD AND APPARATUS TO FORM LIQUID CRYSTAL ALIGNMENT LAYER

FIELD OF THE INVENTION

The present invention relates in general to liquid crystal displays, and in particular to material structures and preparation methods for the alignment of the liquid crystal material that forms a portion of a liquid crystal display.

DESCRIPTION OF THE RELATED ART

Liquid crystal display (LCD) technology is used worldwide in a variety of products ranging from watches through cellular phones to computers. The revenue associated with this industry is estimated to be several billion dollars annually.

An essential requirement, in the manufacture of liquid crystal displays, is the alignment of the liquid crystal molecules on the surfaces (hereinafter "alignment surface") of a substrate (hereinafter "alignment layer"). The liquid crystal molecules are placed on the alignment surface prior to the formation of the liquid crystal display cell. The pervasive method for producing such an alignment surface is to coat with a film, such as a polyimide film, and then rub the coated surface with a velvet cloth. This rubbing process realigns the polyimide surface to form the alignment surface. The alignment surface provides a directional template for the alignment of the liquid crystal molecules in contact with the surface.

The rubbing method has been the process of choice for the last three decades to provide the alignment surface required for LCD=s. However, its been recognized by the industry that a non-contact or a non-rubbed method of surface alignment is very desirable for future manufacturing. The rubbing process introduces debris from the cloth in an otherwise clean room environment. The rubbing process can also lead to electrostatic charge build up, which can destroy the transistors below the polyimide surface. Since these transistors are essential for the operation of modem liquid crystal display devices, it is especially important to provide a method of forming the alignment surface that does not threaten the viability of these transistors.

U.S. Pat. No. 5,770,826 to Chaudhari et al. shows a non-contact technique that uses a low energy ion beam to modify the surface of a wide class of materials to develop directionality useful in forming an alignment layer. This directionality, or orientational order, then aligns liquid crystal molecules. It has been shown that liquid crystal display panels can be built using these inventions.

A strong driving force in liquid crystal display technology is to improve the visual quality of the overall liquid crystal display panel. However, no method is known to control the parallelism of liquid crystals. Parallelism is a key factor to obtaining uniform liquid crystal display panel uniformity.

SUMMARY OF THE INVENTION

It is an object of the present invention to provide a method to form an alignment surface for use in a liquid crystal display cell.

It is also an object of the present invention to provide an improved non-contact method for preparing an alignment surface for a liquid crystal display cell.

It is still another object of the present invention to provide a method of determining at least one ion beam source operation parameter to achieve a twist angle that is less than a predetermined maximum twist angle.

It is yet another object of the present invention to provide a method of preparing an alignment surface for a liquid crystal display cell.

It is further an object of the present invention to provide an improved liquid crystal display cell and display.

The present invention, in brief summary, is a method for forming an alignment surface for use in a liquid crystal display that includes the steps of (1) providing a particle beam source having a plurality of particle beamlets emanating from a grid surface; (2) providing an alignment layer having a surface; and (3) exposing the alignment surface to the particle beam source to create an alignment surface. The step of exposing the alignment surface to the particle beam source further includes the initial steps of (3a) estimating a current density at the grid surface; (3b) using the estimated current density to estimate a beam divergence angle for each of the plurality of particle beamlets; (3c) calculating a dominant beam incident angle for the plurality of particle beamlets; and (3d) determining at least one ion beam source operation parameter to achieve a twist angle that is less than a predetermined maximum twist angle.

DETAILED DESCRIPTION OF THE INVENTION

Figure 1:
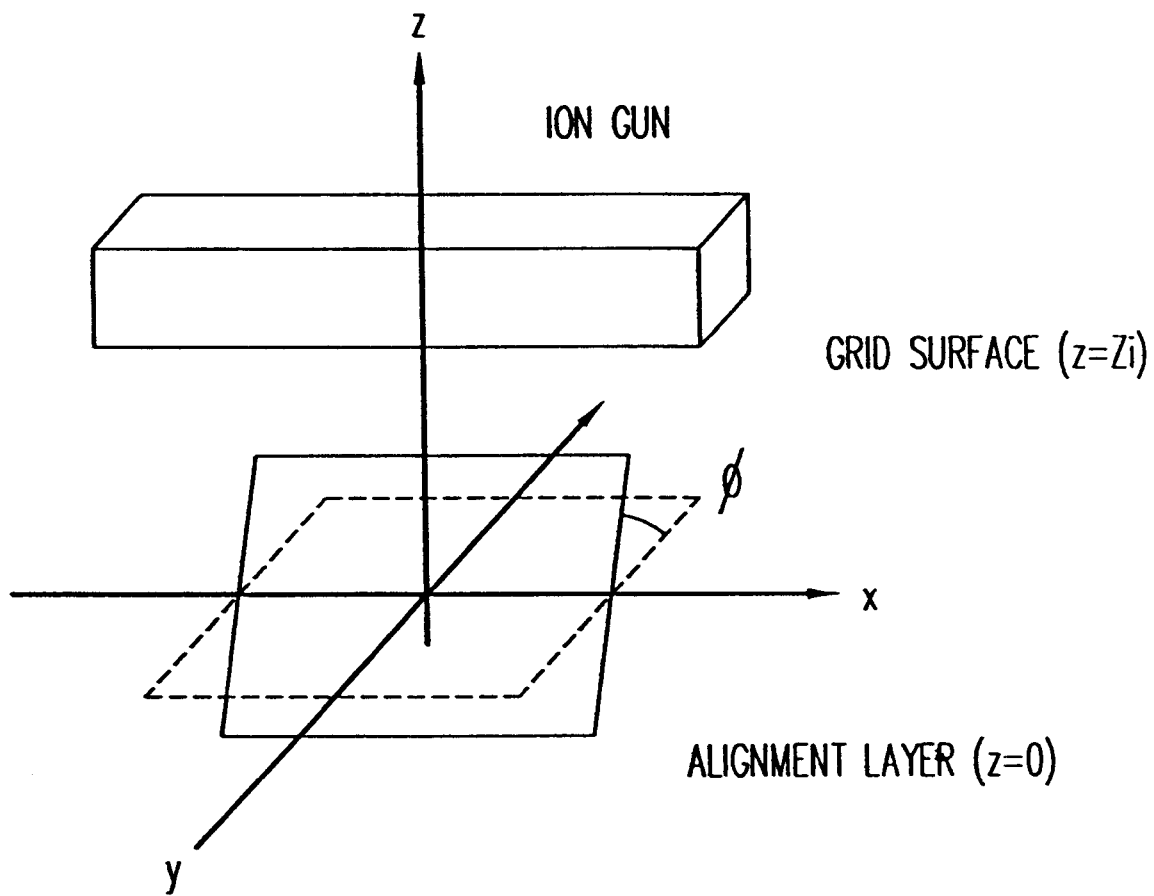
FIG. 1 illustrates a coordinate system according to the present invention.

The disclosure of commonly assigned U.S. Pat. No. 5,770,826 to Chaudhari et al. is incorporated by reference herein in its entirety. FIG. 1 of the U.S. Pat. No. 5,770,826 provides a schematic drawing of an example of an ion beam system useful for the purpose of practicing this invention.

To date there has been no method available to control the cumulative effect of the beam divergence resulting from the summation of the individual beam divergence angle of a plurality of ion source grid beamlet apertures in the grid. A need exists for a method to control overall beam divergence which affects manufacturing liquid crystal panel displays through the non-contact ion beam technique. However, particle beams, such as atomic or ion beams, have inherent divergence that corresponds to a Gaussian curve. The inherent divergence of the particle beam (hereinafter "dominant beam incident angle") extends along the x-axis direction. The dominant beam incident angle and the twist angle are related parameters that affect the formation of alignment surface.

Referring to FIG. 1 of the present application, it is known that when a beam of Argon ions, particularly a low voltage beam of Argon ions, is used to bombard the surface of an alignment film, the beam produces directional alignment when the beam is at an angle other than perpendicular to the surface. Accordingly, the alignment layer and its surface is disposed at an angle $\phi$ relative to the x-axis. The ion beam source 70 is disposed such that the overall grid surface of the ion gun is aligned parallel to the x-axis, perpendicular to the y-axis and at an angle $\phi$ relative to the surface of the alignment layer. If the intensity of each beamlet is uniform, the dominant beam incident angle is uniform along the length of the gun, and the liquid crystals will align along the y-axis. In addition, each beamlet has a beam divergence that contributes to the cumulative beam divergence. When the beam divergence of one beamlet interferes with the beam divergence of an adjacent or nearly adjacent beamlet, the uniformity of the dominant beam incident angle is usually affected. Any variance of the dominant beam incident angle will affect the uniformity of liquid crystal alignment on the surface of the substrate. The offset angle of liquid crystal alignment in the x-y plane is "twist angle." Thus, the terms "dominant beam incident angle" and "twist angle" are related parameters. "Dominant beam incident angle" refers to the angle of the beam relative to the y-axis, whereas "twist angle" refers to the angle of liquid crystal alignment relative to the y-axis resulting from a non-uniform dominant beam incident angle.

An explanation of the ion beam process is set forth below.

Diffusion Process of a Particle Beam

Figure 2:
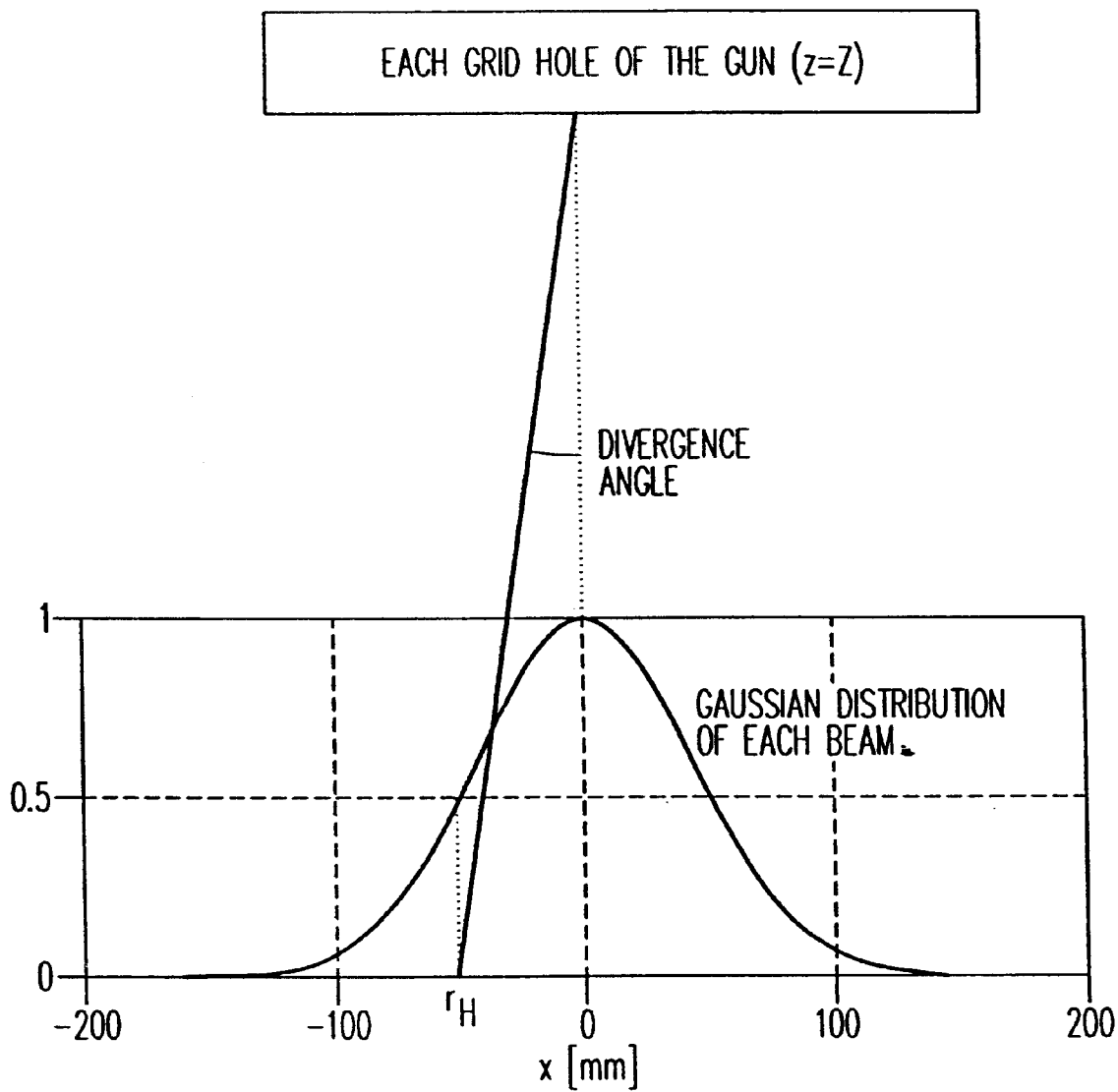
FIG. 2. illustrates the definition of beam divergence angle according to the present invention.

Referring to FIG. 2, the divergence of any particle beam follows a two-dimensional Gaussian function set forth below in Formula (1);

$$G_\sigma(r) = \frac{1}{4\pi^2\sigma^2}\exp\left(\frac{-r^2}{4\pi\sigma^2}\right), \tag{1}$$

where $\sigma^2$ is variance and r is distance perpendicular to beamlet main axis.

Referring to FIGS. 1 and 2, the ion beam current density of the position (x, y, z)=($x_1$,0,0) at surface of the alignment layer due to the contribution of the beamlets coming from all grid holes (x, y, z)=($X_i$, $Y_i$, $Z_i$) (i=1, . . . N) is calculated by the following formula (2), where N=number of grid beamlet apertures (hereinafter "beamlet apertures"):

$$J_s(x_1, 0, 0) = \sum_i \frac{J_i^0\cos\phi}{4\pi^2\sigma_i^2}\exp\left(\frac{-r_i^2}{4\pi\sigma_i^2}\right), \tag{2}$$

$$r_i^2 = (X_i - x_1)^2 + Y_i^2,$$

where $J_s$ is current density at the surface of the alignment layer, $\Phi$ is the tilt angle of alignment layer, $\sigma_2^i$ is the variance at distance $Z_i$, i=1, . . . , N, and $J_i^0$ is the current density at the grid surface (2=$Z_i$).

$Z_i$ and $\sigma_i$ are proportional because a particle beam spreads proportionally to the distance traveled from the source. Therefore, Formula (2) may be rewritten as Formula (3) below.

$$J_s(x_1, 0, 0) = \sum_i \frac{J_i^0\cos\phi}{4\pi^2 k_i^2 Z_i^2}\exp\left(\frac{-r_i^2}{4\pi k_i^2 Z_i^2}\right), \tag{3}$$

where $k_i Z_i = \sigma_i$, $^k$: constant.

Definition of Beam Divergence Angle

The particle beamlet (neutralized) emanating from each beamlet aperture follows the two-dimensional Gaussian distribution discussed above and illustrated in FIG. 2. Beam divergence is defined herein as a half angle at which current density decays to one-half of its peak value. Referring to FIG. 1 and by using Formula (1), the following equation is obtained.

$$G_\sigma(0) = 2G_\sigma(r_H)$$

where $r_H$ is position of a half decay. Solving this equation by $r_H$, we obtain $$r_H = 2\sigma\sqrt{\pi\ln 2}. \tag{4}$$

How to Estimate Beam Divergence Angle

Referring to FIG. 2, the relation between the beam divergence angle and $k_i$ is calculated by using Formula 5 below:

$$\tan\theta_i = \frac{r_H}{Z_i} \cong \frac{2\sqrt{\pi\ln 2}\cdot\sigma_i}{Z_i} = 2\sqrt{\pi\ln 2}\cdot k_i. \tag{5}$$

Figure 3:
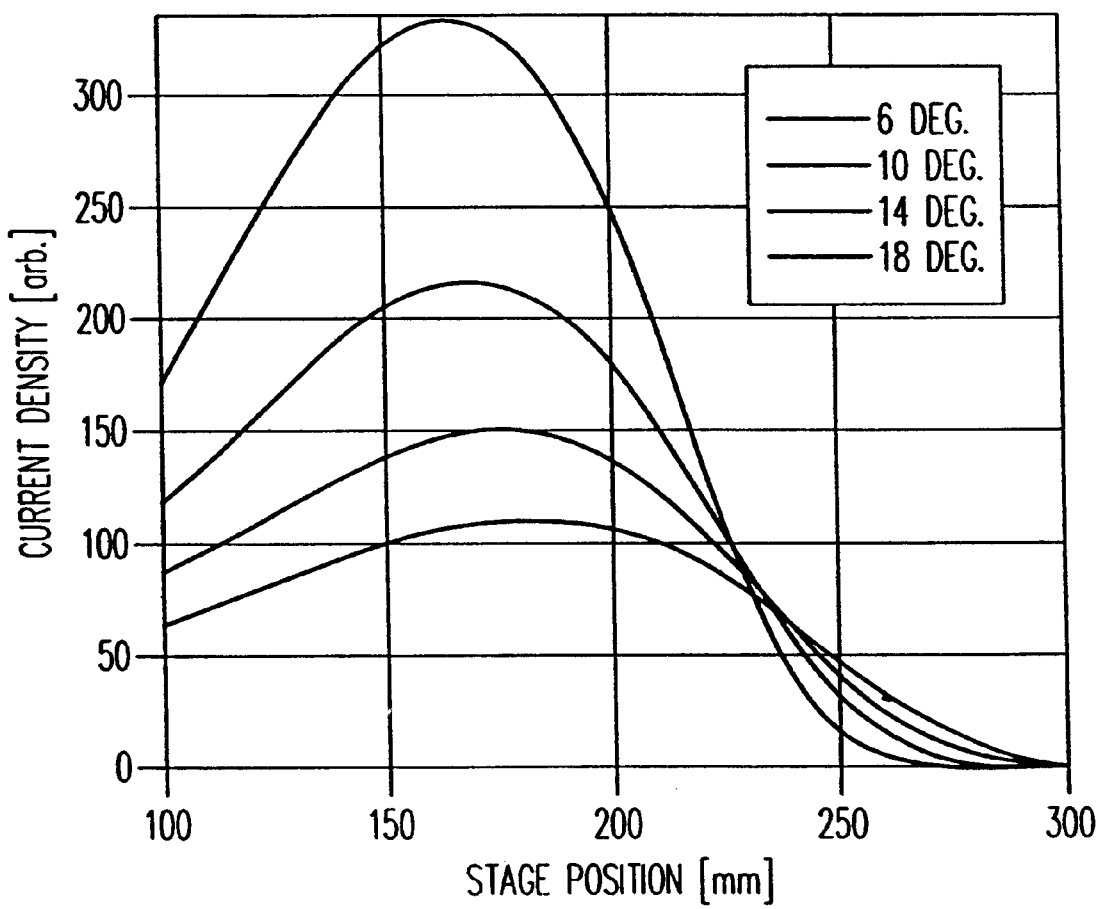
FIG. 3 illustrates current density as a function of beam divergence according to the present invention.

FIG. 3 shows a current density profile of various beam let divergences at z=0. Therefore by comparing FIG. 3 and actual current density profile, the actual beam divergence angle can be estimated.

Estimating the Current Density at the Grid Surface by Solving the Inverse Problem of the Gaussian Diffusion Process The current density profile at the surface of the alignment layer is the result of the Gaussian diffusion process of each beamlet. Therefore, if we know the beam divergence angle and the current density at the surface of the alignment layer, the current density at the grid surface can be estimated by solving the inverse problem. To determine the current density at the grid surface it is important to estimate the dominant beam incident angle, which is explained below.

The method for calculating an inverse matrix using current is well known by those in the art. For example, suppose $J_i^0$ is the current density at the grid surface and $J_i$ is the current density at the surface of the alignment layer, $J_i^0$ can be obtained by using a diffusion matrix. To simplify the explanation, a calculation for a one-dimensional grid is set forth below in Formula 6.

$$J_s(x_1) = \sum_j^N J_j^0 G_j(x_i), \tag{6}$$

where $G_j(x_i)$ is a j-th Gaussian diffusion function of position $x_i$.

Formula (6) is then converted to matrix Formula (7)

$$\begin{bmatrix} J(x_1) \\ \vdots \\ J(x_N) \end{bmatrix} = \begin{bmatrix} G_1(x_1) & \cdots & G_N(x_1) \\ \vdots & \ddots & \vdots \\ G_1(x_N) & \cdots & G_N(x_N) \end{bmatrix} \begin{bmatrix} J_1^0 \\ \vdots \\ J_N^0 \end{bmatrix} \tag{7}$$

By calculating the inverse matrix, $J_i^0$ is obtained using Formula (8) below.

$$\begin{bmatrix} J_1^0 \\ \vdots \\ J_N^0 \end{bmatrix} = \begin{bmatrix} G_1(x_1) & \cdots & G_N(x_1) \\ \vdots & \ddots & \vdots \\ G_1(x_N) & \cdots & G_N(x_N) \end{bmatrix} \begin{bmatrix} J(x_1) \\ \vdots \\ J(x_N) \end{bmatrix}. \quad (8)$$

where $[\ ]^T$ means inverse matrix. However, $J_i^0$ (for all i) must not be negative since this is a value for current density. Unfortunately, due to noise and measurement error of $J_i$, this method for calculating the current density at the grid surface may result in large negative values for $J_i^0$. Therefore, the method for calculating the inverse matrix utilizing Formula (8) does not solve the problem of calculating the current density at the grid surface.

Method of Estimating Current Density at Grid Surface According to the Present Invention The present invention provides a preferred method for estimating the current density at the grid surface by minimizing the mean square error between the real or actual current density and the estimated current density at the grid surface.

$$E(J_1^0, J_2^0, K, J_N^0) = \int \left| f(x) - \sum_n^N J_n^0 G_n(x) \right|^2 dx, \quad (9)$$

where $f(x)$ is the current density profile observed on the alignment surface. To minimize E in Formula (9), the gradient of E by $J_i^0$ must be zero for all i, as set forth in Formula (10) below.

$$\frac{\partial E}{\partial J_i^0} = -2 \int f(x) G_n(x) dx + 2 \sum_i^N \sum_j^N J_j^0 \int G_i(x) G_j(x) dx = 0. \quad (10)$$

Formula (10) can be rewritten by using the following matrix expression set forth below in Formula (11).

$$\begin{bmatrix} \int G_1 G_1 dx & \cdots & \int G_1 G_N dx \\ \vdots & \ddots & \vdots \\ \int G_N G_1 dx & \cdots & \int G_N G_N dx \end{bmatrix} \begin{bmatrix} J_1^0 \\ \vdots \\ J_N^0 \end{bmatrix} = \begin{bmatrix} \int f(x) G_1(x) dx \\ \vdots \\ \int f(x) G_N(x) dx \end{bmatrix}. \quad (11)$$

By calculating the inverse matrix according to Formula (11), one can estimate $J_i^0$ using Formula (12), as follows.

$$\begin{bmatrix} J_1^0 \\ \vdots \\ J_N^0 \end{bmatrix} = \begin{bmatrix} \int G_1 G_1 dx & \cdots & \int G_1 G_N dx \\ \vdots & \ddots & \vdots \\ \int G_N G_1 dx & \cdots & \int G_N G_N dx \end{bmatrix} \begin{bmatrix} \int f(x) G_1(x) dx \\ \vdots \\ \int f(x) G_N(x) dx \end{bmatrix}. \quad (12)$$

Figure 4:
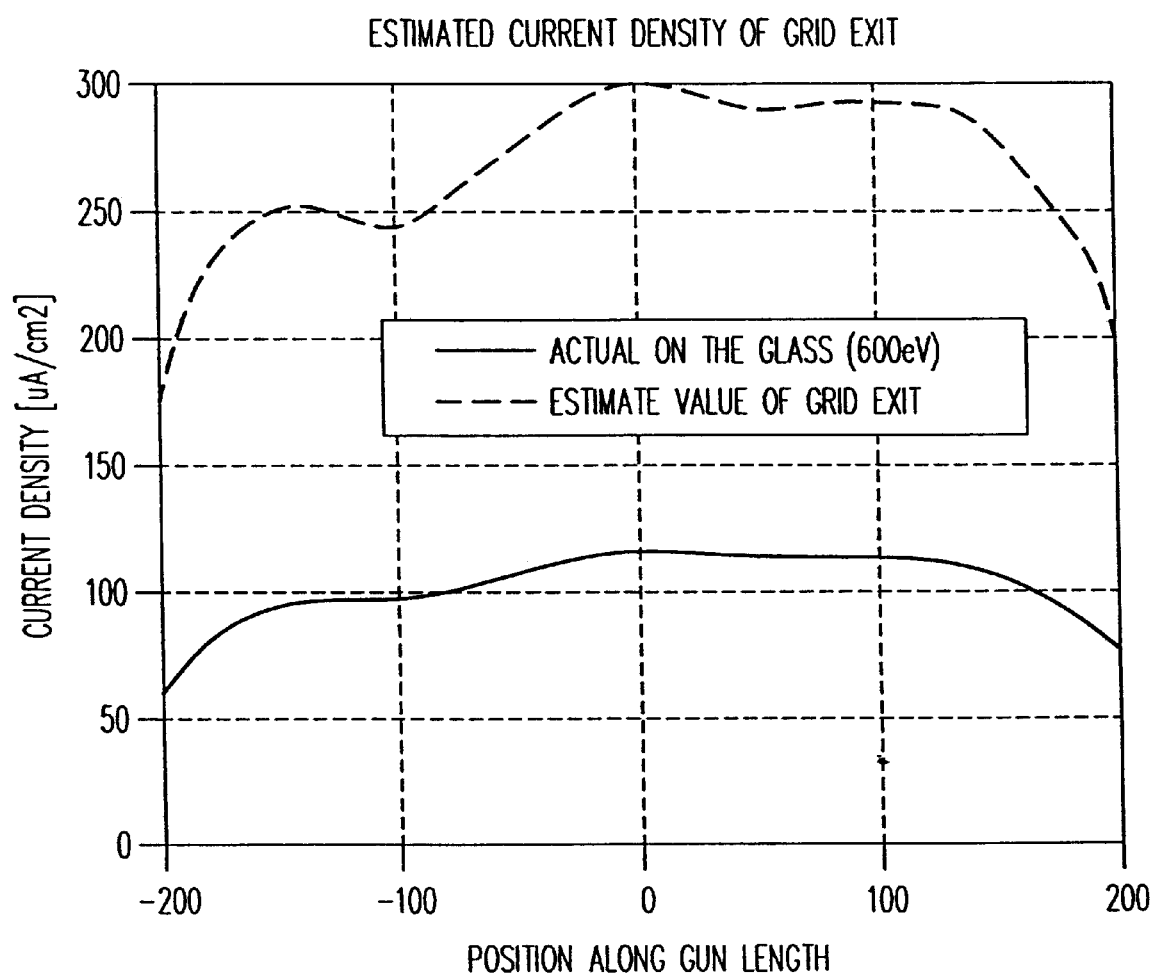
FIG. 4. illustrates a comparison of estimated current density profile at the grid surface as compared to actual/measured current density on the alignment surface as a function of position of beamlet aperture along gun length.

FIG. 4 illustrates a comparison of estimated current density at the grid surface versus current density observed at the alignment surface is illustrated in FIG. 4. In FIG. 4, the thick black line represents current density observed at the alignment surface. The dashed line represents the estimated current density at the grid surface as calculated according to the present invention.

Method of Calculating Dominant Beam Incident Angle

By using the estimated current density at the grid surface, the dominant beam incident angle can be calculated. The maximum component among each beamlet can be calculated as set forth below in Formula (13).

$$J_{max}(x_1, 0, 0) = \max_i \frac{J_i^0 \cos\phi}{4\pi^2 k_i^2 Z_i^2} \exp\left(\frac{-r_i^2}{4\pi k_i^2 Z_i^2}\right) \quad (13)$$

Figure 5B:
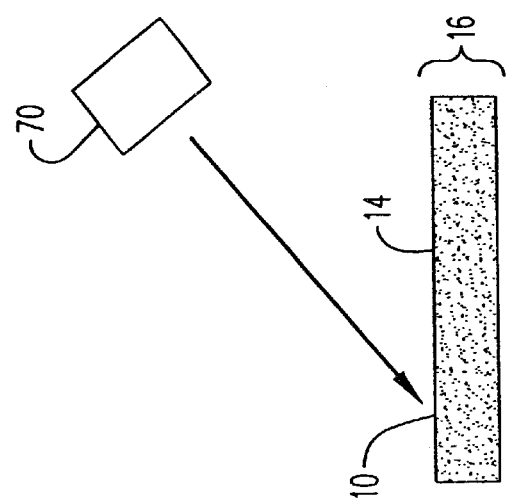
FIG. 5b illustrates a side view of the model illustrated in FIG. 5a taken along lines 5—5.
Figure 5A:
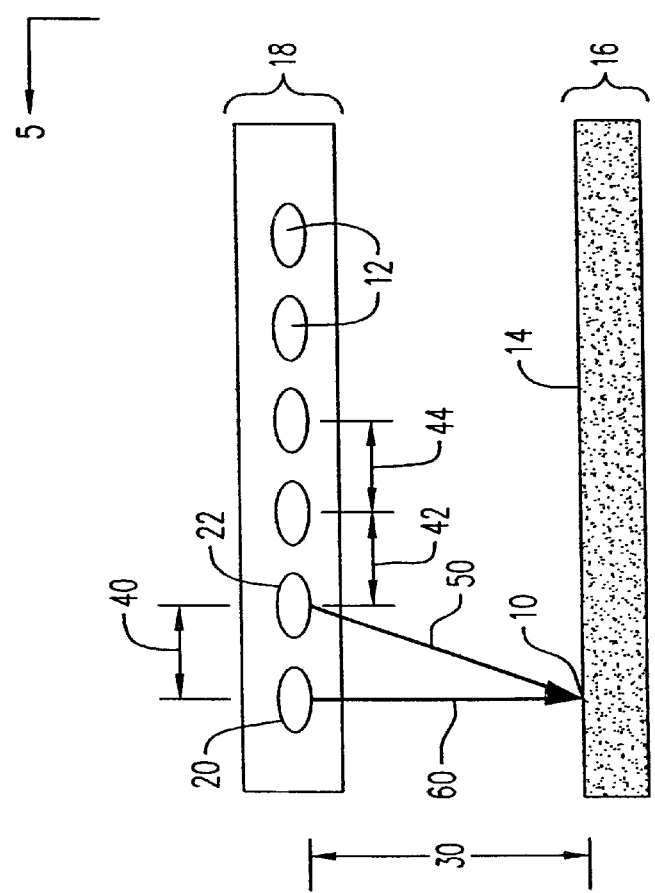
FIG. 5a illustrates a model of a preferred embodiment of the present invention utilizing a twist angle.

Referring to FIG. 5a, at a point 10 on the alignment surface, if the beam divergence component from beamlet aperture 22 is greater than a beam divergence component from any other beamlet aperture, then $r_2$ is $r_{imax}$. Thus, once the maximum i obtained, the dominant beam incident angle can be calculated by Formula (14)

$$\psi = \arctan\left(\frac{r_{i\,max}}{Z_{i\,max}}\right), \quad (14)$$

where $r_{imax}$ is an ion beam source parameter that compensates for beam divergence component resulting from $r_2$. Thus dominant beam incident angle can be calculated by the using current density profile and beam divergence. In addition, since the alignment surface and the grid surface should be parallel, Zi is the same for each beamlet aperture, i.e., $Z_1 = Z_2 = \ldots Z_n$.

The Relationship Between Dominant Beam Incident Angle and the Alignment Direction of a Liquid Crystal On the surface of the alignment layer, liquid crystals tend to follow the alignment formed by the dominant beam incident angle. This is true because X-Y anisotropy of the surface energy is the largest along this direction.

Determining the Ion Beam Parameters Required to Achieve $\psi$ Degree Twist Angle Criteria for Liquid Crystal Alignment Referring to FIG. 5a, the distance 40, 42, 44 between adjacent beamlet apertures 12 on the grid surface 18 ("grid pitch") is $r_i$ and the distance 30 ("working distance") of the grid surface from a point 10 on the alignment surface 14 of the alignment layer 16 is $Z_i$. If the beam intensity at position 10 on the alignment surface 14 is greater from a second beamlet 50 emanating from an adjacent beamlet aperture 22 than the beam intensity of a first beamlet 60 emanating from the beamlet aperture 20 directly above point 10, the resultant twist angle of liquid crystal $\psi$ can be calculated by the following formula:

$$\psi = \arctan\left(\frac{r_i}{Z_i}\right)$$

The contribution of beamlet aperture r, to the dominant beam incident angle can be calculated by using Formula (15):

$$J_s(x_1, 0, 0)|_{J_1^0} = \frac{J_1^0 \cos\phi}{4\pi^2 k_1^2 Z_1^2} \exp\left(\frac{-r_1^2}{4\pi k_1^2 Z_1^2}\right) = \frac{J_1^0 \cos\phi}{4\pi^2 k_1^2 Z_1^2}, \quad (15)$$

because $r_1 = 0$.

The contribution of beamlet aperture $r_2$ to the dominant beam incident angle can be calculated by using Formula (16).

$$J_s(x_1, 0, 0)|_{J_2^0} = \frac{J_2^0 \cos\phi}{4\pi^2 k_2^2 Z_2^2} \exp\left(\frac{-r_2^2}{4\pi k_2^2 Z_2^2}\right). \quad (16)$$

Thus, if $J_s(x,0,0)|_{j_2^0} > J_s(x,0,0)|_{j_1^0}$, the liquid crystal at position $x_i$ on the alignment surface will twist $\psi$ degrees (i.e., twist angle).

By using Formulas (15) and (16), an allowable ratio of $J_s(x,0,0)|_{J_2^0}/J_s(x,0,0)|_{J_1^0}$ can be calculated to determine the ion beam source operation parameters required to reduce or eliminate the twist angle of the liquid crystal on the alignment surface.

$$\frac{J_s(x, 0, 0)|_{J_2^0}}{J_s(x, 0, 0)|_{J_1^0}} = \frac{J_2^0}{J_1^0 \exp\left(\frac{-r_2^2}{4\pi k_2^2 Z_2^2}\right)} = \frac{J_2^0}{J_1^0 \exp\left(\frac{-\ln 2 \cdot \tan^2\psi}{\tan^2\theta}\right)}, \quad (17)$$

where $\theta$ is the beam divergence angle and $\psi$ is the twist angle.

Therefore, when $$\frac{J_s(x, 0, 0)|_{J_2^0}}{J_s(x, 0, 0)|_{J_1^0}} = \frac{J_2^0}{J_1^0 \exp\left(\frac{-\ln 2 \cdot \tan^2\psi}{\tan^2\theta}\right)} > 1,$$

a liquid crystal at position $x_1$ on the alignment surface will twist $\psi$ degree. Thus, the desired parameters to achieve a desired twist angle $\psi$ may be rewritten according to Formula (18).

$$\frac{J_2^0}{J_1^0} < \exp\left(\frac{-\ln 2 \cdot \tan^2\psi}{\tan^2\theta}\right), \quad (18)$$

where $\theta$ is the beam divergence angle and $\psi$ is the twist angle.

EXAMPLE 1

Referring to FIGS. 5a and 5b, when the distance (r) between adjacent beamlet apertures on the grid surface (i.e., the "grid pitch") is 4.2 mm and the working distance ($Z_i$) is 240 mm, and the intensity on the alignment surface from a second beamlet 50 from the adjacent beamlet aperture hole 22 is greater than that that of a first beamlet 60 from the beamlet aperture 20, the twist angle of liquid crystal becomes 1 degree.

arc tan(4.2/240)=1[degree]

Figure 6:
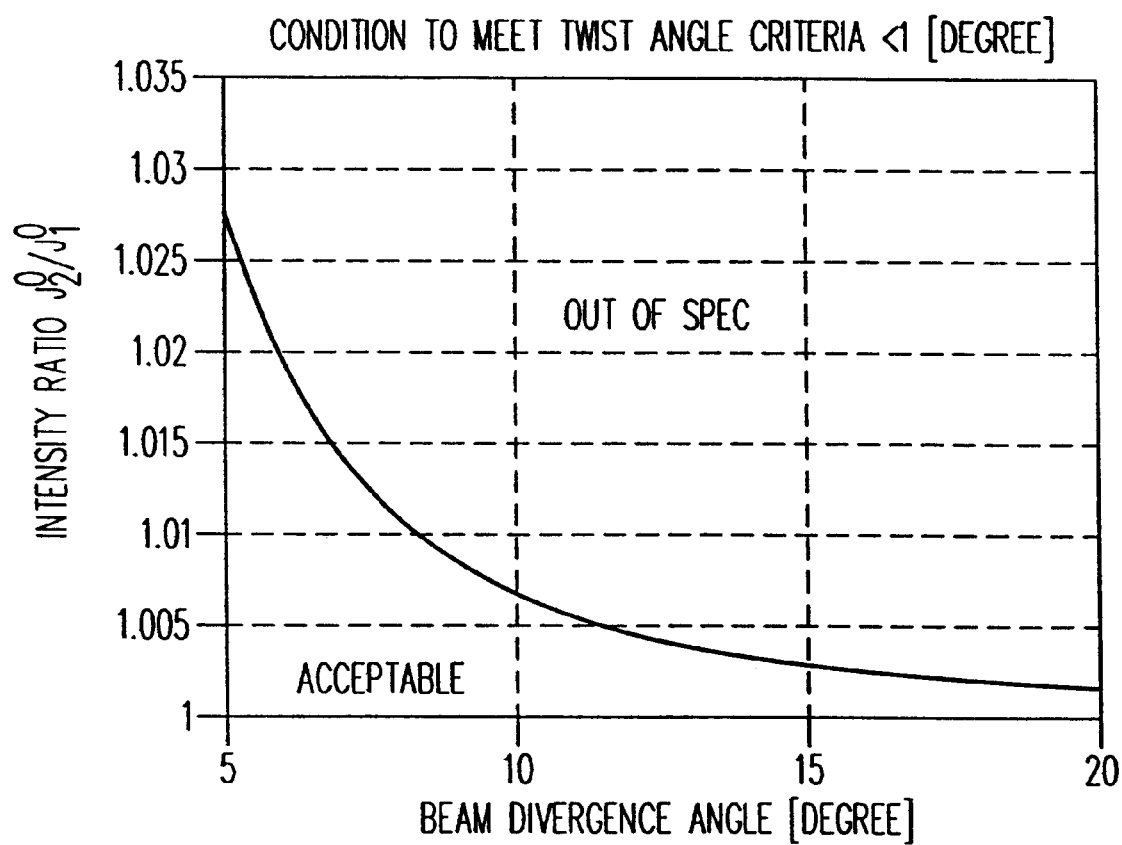
FIG. 6 is a graph illustrating intensity ratio versus beam divergence angle and is useful in determining acceptable twist angle criteria.

Reference can be made to FIG. 6, where acceptable operation criteria can be selected based on this maximum amount of acceptable twist.

Various modifications and alterations to the present invention may be appreciated based upon a review of this disclosure. These changes and additions are intended to be within the scope and spirit of the present invention as defined by the following claims.

What is claimed is:

1. A method for forming an alignment surface for use in a liquid crystal display cell comprising the steps of:
   providing a particle beam source having a plurality of particle beam lets emanating from a grid surface;
   providing an alignment layer having a surface; and
   exposing said surface to said plurality of particle beamlets to create an alignment surface,
   wherein the step of exposing comprises the initial steps of:
      estimating a current density of said plurality of particle beamlets at said grid surface;
      using said estimated current density to estimate a beam divergence angle for each of said plurality of particle beamlets;
      calculating a dominant beam incident angle for said plurality of particle beamlets; and
      determining an operation parameter of said particle beam source from said estimated beam divergence angle and said dominant beam incident angle, to achieve a twist angle that is less than a predetermined maximum twist angle.

2. The method of claim 1,
   wherein said plurality of particle beamlets includes a first particle beamlet having a first beam incident angle and a second particle beamlet having a second beam incident angle, and
   wherein the step of determining said operation parameter further includes the step of calculating said twist angle as a function of said first and second beam incident angles.

3. The method of claim 2, wherein said function is represented by $$\frac{J_2^0}{J_1^0} = \exp\left(\frac{-\ln 2 \cdot \tan^2\psi}{\tan^2\theta}\right),$$

wherein $J_1^0$=current density of said first particle beamlet at a first aperture of said grid surface,
   $J_2^0$=current density of said second particle beamlet at a second aperture of said grid surface,
   $\psi$=said twist angle, and
   $\theta$=a beam divergence angle.

4. The method of claim 3, wherein the value of said function is less than 1.

5. The method of claim 1, further comprising the step of bombarding said alignment surface with said plurality of particle beamlets.

6. The method of claim 5, further comprising placing at least one liquid crystal on said bombarded alignment surface.

7. The method of claim 6, further comprising the step of forming a liquid crystal display cell.

8. The method of claim 7, further comprising the step of forming a liquid crystal display.

9. The method of claim 1, wherein said particle beam source comprises an ion beam source.

* * * * *